United States Patent
Licht et al.

(10) Patent No.: US 11,274,747 B2
(45) Date of Patent: Mar. 15, 2022

(54) PISTON FOR AN INTERNAL COMBUSTION ENGINE

(71) Applicant: Mahle International GmbH, Stuttgart (DE)

(72) Inventors: Philipp Licht, Stuttgart (DE); Rainer Scharp, Vaihingen (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/938,907

(22) Filed: Jul. 24, 2020

(65) Prior Publication Data

US 2021/0025494 A1 Jan. 28, 2021

(30) Foreign Application Priority Data

Jul. 25, 2019 (DE) ...................... 10 2019 211 081.9

(51) Int. Cl.
*F16J 9/20* (2006.01)
*F16J 1/09* (2006.01)
*F16J 9/06* (2006.01)

(52) U.S. Cl.
CPC . *F16J 9/20* (2013.01); *F16J 1/09* (2013.01); *F16J 9/06* (2013.01)

(58) Field of Classification Search
CPC ........ F16J 9/20; F16J 9/203; F16J 9/06; F16J 1/09; F16J 1/08; F02F 5/00; F02F 2200/00
See application file for complete search history.

(56) References Cited

U.S. PATENT DOCUMENTS

| 3,554,568 A | * | 1/1971 | Heid, Jr. | .................... F16J 9/20 |
| | | | | 277/452 |
| 3,563,140 A | * | 2/1971 | Hollingsworth | ......... F16J 9/203 |
| | | | | 92/160 |
| 3,733,973 A | | 5/1973 | Elsbett et al. | |
| 4,011,030 A | * | 3/1977 | Staebler | .................. F01C 9/005 |
| | | | | 418/51 |

(Continued)

FOREIGN PATENT DOCUMENTS

| DE | 20 08 140 A1 | 9/1971 |
| DE | 39 28 491 A1 | 3/1991 |

(Continued)

OTHER PUBLICATIONS

English abstract for EP-1 264 980.

(Continued)

*Primary Examiner* — Grant Moubry
(74) *Attorney, Agent, or Firm* — Fishman Stewart PLLC

(57) ABSTRACT

A piston for an internal combustion engine may include at least one oil ring groove configured to receive an oil scraper ring. The at least one oil ring groove may have an upper groove flank, a lower groove flank, and a groove base. The at least one oil ring groove may be structured to be asymmetrical and deeper in a radial direction in a region of the lower groove flank. The piston may also include an oil outflow channel structured and arranged to fluidically communicate with an oil collecting chamber disposed in a spine of the oil scraper ring. A connecting point between at least one of (i) the at least one oil ring groove and the oil outflow channel, and (ii) the oil collecting chamber and the oil outflow channel may be disposed exclusively in the lower groove flank.

19 Claims, 2 Drawing Sheets

(56) References Cited

U.S. PATENT DOCUMENTS

| | | | |
|---|---|---|---|
| 4,473,232 A * | 9/1984 | Umeha | F16J 9/062 |
| | | | 277/472 |
| 4,614,150 A * | 9/1986 | Deutschmann | F02B 23/0603 |
| | | | 92/221 |
| 5,251,915 A * | 10/1993 | Meernik | F16J 9/062 |
| | | | 277/457 |
| 6,547,251 B1 * | 4/2003 | Hitosugi | F16J 9/062 |
| | | | 277/449 |
| 6,682,078 B2 * | 1/2004 | Hitosugi | F16J 9/062 |
| | | | 277/449 |
| 7,493,882 B2 * | 2/2009 | Hiraishi | F16J 9/00 |
| | | | 123/193.2 |
| 7,963,212 B2 * | 6/2011 | Ishida | F16J 1/09 |
| | | | 92/193 |
| 7,997,249 B2 * | 8/2011 | Matsui | F02F 3/22 |
| | | | 123/193.6 |
| 9,228,530 B2 * | 1/2016 | Kodama | F16J 1/09 |
| 9,605,758 B2 | 3/2017 | Gniesmer et al. | |
| 10,125,719 B2 * | 11/2018 | Azevedo | F02F 3/0015 |
| 10,337,450 B2 | 7/2019 | Laqua et al. | |
| 2015/0211438 A1 * | 7/2015 | Dembinski | B23P 15/10 |
| | | | 123/193.6 |
| 2016/0040622 A1 * | 2/2016 | Donahue | F16J 9/064 |
| | | | 123/193.4 |

FOREIGN PATENT DOCUMENTS

| | | |
|---|---|---|
| DE | 10 2012 006 834 A1 | 3/2013 |
| DE | 10 2015 212 445 A1 | 1/2016 |
| EP | 1 264 980 A2 | 12/2002 |
| JP | 2006-161767 A | 6/2006 |
| JP | 2007-297975 A | 11/2007 |

OTHER PUBLICATIONS

English abstract for DE-39 28 491.
English abstract for JP-2007-297975.
English abstract JP-2006-161767.

* cited by examiner

PISTON FOR AN INTERNAL COMBUSTION ENGINE

CROSS-REFERENCE TO RELATED APPLICATIONS

This application claims priority to German Patent Application No. DE 10 2019 211 081.9, filed on Jul. 25, 2019, the contents of which is hereby incorporated by reference in its entirety.

TECHNICAL FIELD

The present invention relates to a piston for an internal combustion engine, having at least one oil ring groove for receiving an oil scraper ring, which oil ring groove has an upper groove flank, facing toward a piston crown, and a lower groove flank, averted from the piston crown, and a groove base. The invention also relates to a method for producing an oil ring groove in a piston of said type.

BACKGROUND

EP 1 264 980 B1 has disclosed a generic piston for an internal combustion engine, having at least one oil ring groove for receiving an oil scraper ring, wherein said oil ring groove is formed so as to be asymmetrical and deeper in an inward radial direction in the region of a lower groove flank, averted from a piston crown, and thus has an oil collecting chamber in the spine of the oil scraper ring. Furthermore, an oil outflow channel is provided which has a communicating connection to said oil collecting chamber. The oil collecting chamber transitions here via a connecting point, which lies in the groove base and in the lower groove flank, into the oil outflow channel, such that the oil outflow channel has a communicating connection to the oil collecting chamber via the lower groove flank and the groove base.

DE 39 28 491 A1 has disclosed a piston for an internal combustion engine having an oil ring groove and having a spring element, which, over its height, ends radially at the inside at the same diameter, of the oil ring. The groove base of the oil ring groove in this case lies radially further to the outside in a region adjoining the groove upper flank than in a region adjoining the groove lower flank, whereby a relatively large curvature radius can be achieved at the transition between the groove base and the groove lower flank. By means of the relatively large curvature radius, it is nevertheless possible to achieve relatively high strength of the piston.

A disadvantage of the pistons known from the prior art, however, is that during the provision of an oil outflow channel which proceeds from a lower groove flank and the groove base of the oil ring groove, a three-dimensional edge structure arises during the production process, which edge structure cannot be finish-machined or can be finish-machined only with very great difficulty.

SUMMARY

The present invention is therefore concerned with the problem of specifying, for a piston of the generic type, an improved or at least alternative embodiment which in particular overcomes the disadvantages known from the prior art.

Said problem is solved according to the invention by means of the subject matter of the independent claim(s). Advantageous embodiments are the subject of the dependent claim(s).

The present invention is based on the general concept of forming an oil ring groove of a piston for receiving an oil ring so as to be asymmetrical, and specifically so as to extend radially further outward in a region of an upper groove flank, facing toward a piston crown, then in a region, averted from the piston crown, of a lower groove flank, such that, in the region of the lower groove flank, the oil ring groove extends radially further inward and thus an oil collecting chamber or oil distributing chamber can be created which is situated behind the oil scraper ring. Via the oil collecting chamber or the oil distributing chamber, the collected oil is now discharged via an oil outflow channel, wherein said oil outflow channel, according to the invention, communicates with the oil collecting chamber or the oil ring groove exclusively via a connecting point situated in the lower groove flank. The oil outflow channel thus does not make contact with the groove base at any point.

This has the major advantage that, during the production of the oil outflow channel and the oil ring groove, no three-dimensional edge structure is formed, such as would arise in the case of a connecting point with a corner in the lower groove flank and the groove base and can be finish-machined or deburred only with difficulty. By means of the asymmetrical oil ring groove, it is furthermore possible for an oil collecting chamber to be created which is situated behind the oil scraper ring and in which oil scraped off by the oil scraper ring can be collected and fed to the oil outflow channel. By means of the asymmetrical embodiment of the oil ring groove, it is furthermore possible to prevent the oil scraper ring from undesirably protruding to too great a depth into the ring groove, which in the worst-case could lead to the oil scraper ring from springing out of the groove (ring pop out) on the opposite side of the piston during transport or installation. Here, the piston according to the invention for an internal combustion engine has at least an oil ring groove for receiving the oil scraper ring, which oil ring groove has an upper groove flank, facing toward the piston crown, and a lower groove flank, averted from the piston crown, and a groove base, wherein the groove base connects the upper and the lower groove flank to one another. As mentioned, the oil ring groove is of asymmetrical form and extends deeper inward in the radial direction in the region of the lower groove flank, whereby the above-described oil collecting chamber can be formed in the spine of the oil scraper ring, in particular in the lower region of the spine of the oil scraper ring, into which oil collecting chamber the oil scraper ring cannot protrude even in the event of said oil scraper ring protruding into the oil ring groove, and which oil collecting chamber thus remains reserved for the collection of oil and the distribution of oil or the discharge of oil. According to the invention, it is now the case that an oil outflow channel is provided which has a communicating connection to the oil collecting chamber via a connecting point, wherein the connecting point between the oil ring groove and the oil outflow channel lies exclusively in the lower groove flank. As mentioned, this offers the major advantage that, after production of the oil outflow channel, for example drilling thereof, the oil ring groove is formed in for example by turning, that is to say in a chip-removing process, or grinding, and in the process is led with the lower groove flank over the oil outflow channel, whereby the connecting point is produced. The forming-in of the oil ring groove is however performed to an even greater depth inward in the radial direction, in particular in the region of the lower groove flank, specifically at least to such an extent that the entire connecting point between the oil ring groove, that is to say in particular the oil collecting chamber, and the oil outflow channel lies exclusively in the lower groove flank. With the piston according to the invention, it is thus possible, owing to the asymmetry of the oil ring groove, to achieve an improved collection and discharge of the oil and, with the connecting point between the oil collecting chamber and the oil outflow channel lying exclusively in the lower groove flank, a burr-free production process with no three-dimensional edges. Depending on the degree of the asymmetry, that is to say in particular depending on the size of the oil collecting chamber situated in the spine of the oil scraper ring, it is also possible to achieve a reduction in weight of the piston.

In one advantageous refinement of the solution according to the invention, the oil outflow channel runs parallel to a piston axis and in particular orthogonally with respect to the lower groove flank. In this case, the oil outflow channel thus enters the oil collecting chamber orthogonally via the lower groove flank. This offers the major advantage that the oil that has collected in the oil collecting chamber can flow out downward exclusively under the action of gravitational force.

In an alternative embodiment of the solution according to the invention, the oil outflow channel runs obliquely with respect to a piston axis and in particular also obliquely with respect to the lower groove flank, and is obliquely connected to the latter. Such an obliquely running oil outflow channel may generally have an axis direction which has components in at least two or all three coordinate directions (axial, radial, tangential) of a cylindrical coordinate system in relation to the piston axis. This may for example allow for design circumstances and arrange the oil outflow channel advantageously in a region of the piston which is of lesser relevance with regard to the strength. Here, too, the oil that has collected in the oil collecting chamber can flow out downward exclusively under the action of gravitational force if the axis direction of the oil outflow channel comprises an axial component (in relation to the piston axis).

It is furthermore conceivable for the oil outflow channel to run orthogonally with respect to the piston axis and in particular outward in a radial direction in the lower groove flank. In this exemplary embodiment (in the same way as in the case of an oblique arrangement according to the preceding exemplary embodiment with a radial-tangential oil outflow channel axis without axial component), the oil which has been scraped off by the oil scraper ring and which has collected in the oil collecting chamber is discharged in the direction of the cylinder wall again via the outflow channel. Since this oil outflow channel running orthogonally with respect to the piston axis in the lower groove flank is relatively small, support of the oil scraper ring is not impeded thereby. It is self-evidently also possible for multiple such oil outflow channels to be arranged so as to be distributed over the circumference, such that a uniform discharge of the oil scraped off from a cylinder inner wall can be achieved by means of the respective oil outflow channels.

In a further advantageous embodiment of the solution according to the invention, the upper groove flank has a shoulder which projects into the oil ring groove and which forms a stop for the oil scraper ring and which limits a protrusion depth of the oil scraper ring into the oil ring groove. In this way, it is possible in particular to avoid the so-called ring pop out effect, in the case of which the oil scraper ring protrudes to too great an extent into the oil ring groove on one side of the piston and springs out of said oil ring groove on the other side and is thus damaged. Such a shoulder may be produced for example by means of a different turning tool or different chip-removing tools. For example, it is conceivable for firstly the entire width of the oil ring groove to be introduced using a relatively wide chip-removing tool, whereas, after the shoulder has been reached, a tool of lesser width is used, which deepens the oil ring groove yet further in a radially inward direction in the region of the lower groove flank and, owing to the relatively small width, or the relatively small height in relation to the piston, produces the oil collecting chamber. Then, the connecting point between the oil collecting chamber and the lower groove flank is also opened by means of said second chip-removing tool.

In a further advantageous embodiment of the solution according to the invention, the upper and the lower groove flank are finish-machined, that is to say with a high surface quality, only in a region which comes into contact with the oil scraper ring, whereas the upper and the lower groove flank and the groove base are or remain pre-machined, that is to say with a low surface quality, in the region of the oil collecting chamber. In this way, the piston as a whole can be produced with less outlay, because no particular demands are placed on a surface quality, and would accordingly have to be fulfilled, in particular in the region of the oil collecting chamber. In the region of the groove base, too, there are no particular requirements with regard to, for example, a diameter tolerance.

In one advantageous refinement of the solution according to the invention, the groove base runs obliquely with respect to the piston axis. Such an embodiment may be selected for example as an alternative to the above-described shoulder which projects into the oil ring groove from the upper groove flank, wherein the obliquity of the groove base is realized such that said groove base is inclined radially outward in the direction of the piston crown, such that the groove base extends radially further outward in the region of the upper groove flank than in the region of the lower groove flank. In the case of such an embodiment, an undesired protrusion of the oil scraper ring to too great a depth into the oil ring groove is effected by the obliquity of the groove base itself, because the protrusion of the oil scraper ring to too great a depth into the oil ring groove is prevented as a result of an abutment of the oil scraper ring against the upper and radially further outwardly projecting region of the groove base.

The present invention is furthermore based on the general concept of specifying a method for producing a piston of said type, in which method a piston blank is firstly produced and the oil outflow channel is drilled, or formed in some other way, therein. Subsequently, an asymmetrical oil ring groove, which is formed so as to be deeper in an inward radial direction in the region of the lower groove flank, is formed in, in particular cut in, such that a communicating connecting point between the oil ring groove and the oil outflow channel or the oil collecting chamber and the outflow channel lies exclusively in the lower groove flank. During the forming-in of the oil ring groove for example by means of two chip-removing tools of different width and/or height, the connecting point is thus opened, or the oil outflow channel is cut, and in this way the connecting point to the oil collecting chamber is produced. As a result of the fact that the connecting point is now arranged exclusively in the region of the lower groove flank, a three-dimensional connecting point which can be finish-machined only with difficulty, or which cannot be finish-machined at all, and which extends for example via the lower groove flank and the groove base, can be avoided. The connecting point situated exclusively in the lower groove flank can for example be deburred by means of a corresponding chip-removing or grinding tool.

Further important features and advantages of the invention will emerge from the subclaims, from the drawing and from the associated description of the figures on the basis of the drawing.

It is self-evident that the features mentioned above and the features yet to be discussed below may be used not only in the respective specified combination but also in other combinations or individually without departing from the scope of the present invention.

Preferred exemplary embodiments of the invention are illustrated in the drawings and will be discussed in more detail in the following description, wherein the same reference designations are used to denote identical or similar or functionally identical components.

DETAILED DESCRIPTION

Figure 1:
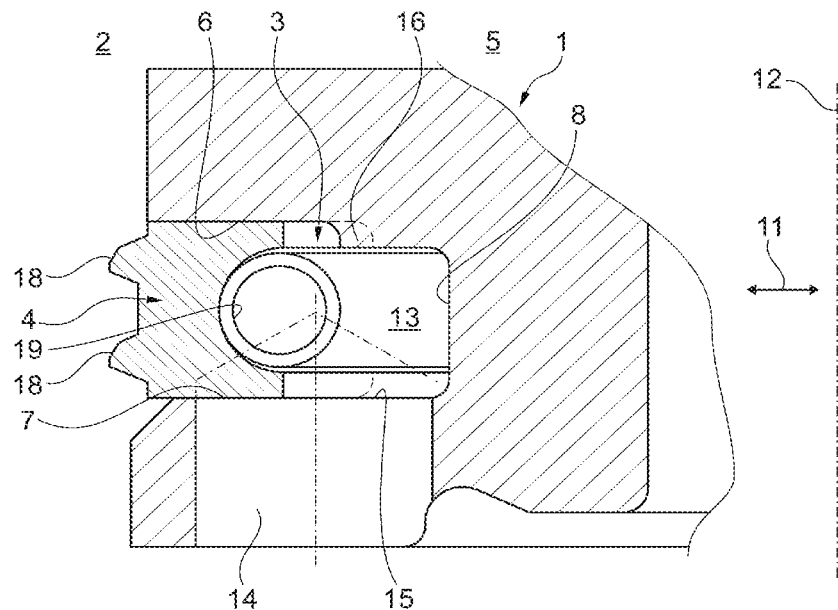
FIG. 1 is a sectional illustration through a piston according to the invention in the region of an oil ring groove.
Figure 2:
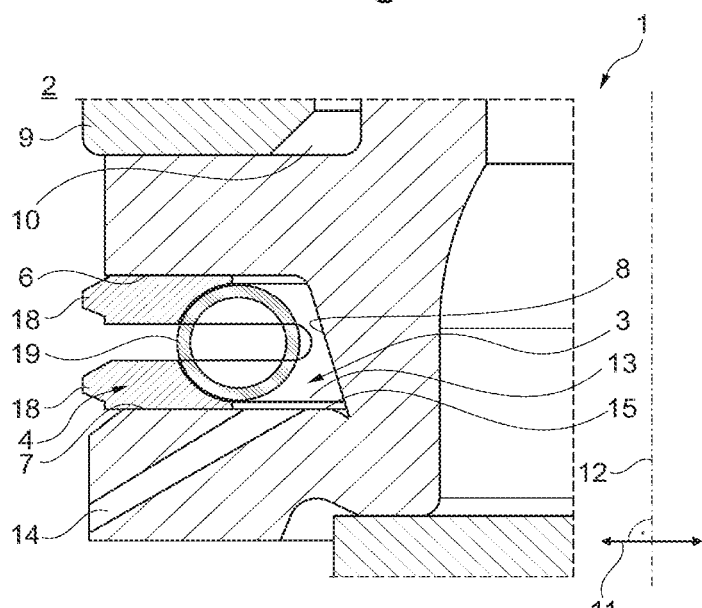
FIG. 2 is an illustration as in FIG. 1, but with a differently formed oil ring groove and differently formed oil outflow channel.
Figure 3:
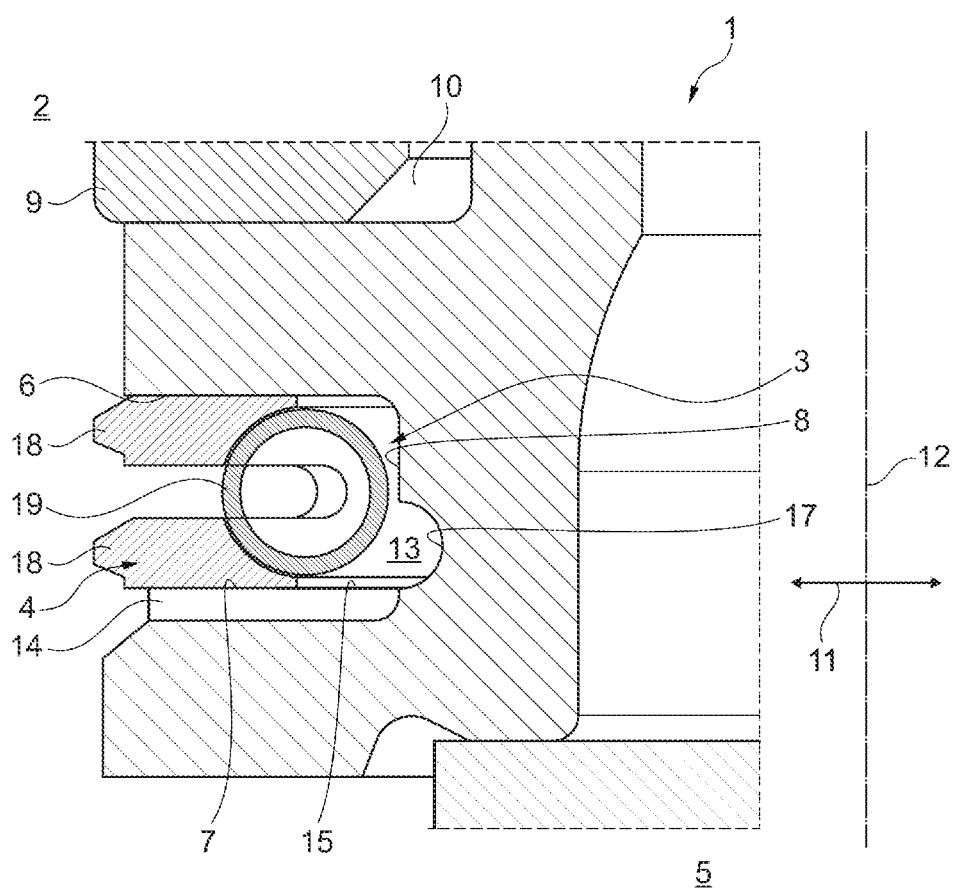
FIG. 3 is an alternative illustration in relation to FIGS. 1 and 2.

Correspondingly to FIGS. 1 to 3, a piston 1 according to the invention for an internal combustion engine 2 (not otherwise shown), in particular in a motor vehicle, has at least one oil ring groove 3 for receiving an oil scraper ring 4, which oil ring groove has an upper groove flank 6, facing toward a piston crown 5, and a lower groove flank 7, averted from the piston crown 5, and a groove base 8. It is self-evidently also possible for yet further piston rings 9 (cf. FIGS. 2 and 3), such as for example compression rings, to be arranged in other ring grooves 10. The oil ring groove 3 is now of asymmetrical form and is formed so as to be deeper in a radial direction 11, that is to say orthogonally with respect to a piston axis 12, in the region of the lower groove flank 7. The groove base 8 thus extends radially further outward in the region of the upper groove flank 6 than in the region of the lower groove flank 7. In the spine of the oil scraper ring 4, that is to say radially within the latter, there is provided an oil collecting chamber 13 via which oil which has been scraped off a cylinder wall (not illustrated) by the oil scraper ring 4 can be collected and discharged via an oil outflow channel 14 which has a communicating connection to the oil collecting chamber 13. According to the invention, it is now the case that a connecting point 15 via which the oil collecting chamber 13 communicates with the oil outflow channel 14 is provided exclusively in the region of the lower groove flank 7, such that the connecting point 15 does not at any point project for example into the groove base 8, whereby the connecting point 15 is of substantially planar form and forms no three-dimensional edge structure.

Here, different orientations of the oil outflow channel 14 are illustrated in FIGS. 1 to 3, wherein the oil outflow channel 14 illustrated in FIG. 1 runs parallel to the piston axis 12 and in particular orthogonally with respect to the lower groove flank 7, whereas the oil outflow channel 14 illustrated in FIG. 2 runs obliquely with respect to the piston axis 12 and in particular also obliquely with respect to the lower groove flank 7 and is thus obliquely connected to the latter. The oil outflow channel 14 as per FIG. 3 runs orthogonally with respect to the piston axis 12, in particular in the radial direction 11, within the lower groove flank 7, such that the lower groove flank 7 is hollowed out in the region of the oil outflow channel 14. Here, within the groove flank 7 self-evidently actually means below the latter.

Considering the embodiment of the piston 1 according to the invention as per FIG. 1, it can be seen that the upper groove flank 6 has a shoulder 16 which projects into the oil ring groove 3 and which forms a stop for the oil scraper ring 4 and which limits a protrusion depth of the oil scraper ring 4 into the oil ring groove 3. In this way, it is possible in particular for a so-called ring pop out, in the case of which the oil scraper ring engages to too deep an extent into the oil ring groove 3 and is lifted out of the oil ring groove 3 on the opposite side, to be avoided. As an alternative to such a shoulder 16, the groove base 8 may also run or be formed obliquely with respect to the piston axis 12, as illustrated in FIG. 2, whereby the oil scraper ring 4 can in turn protrude into the oil ring groove 3 only to such an extent that it abuts against the groove base 8 at the transition between the upper groove flank 6 and said groove base. In the embodiment illustrated in FIG. 3, the groove base 8 has, in a lower, inner region, a radially inwardly directed depression 17, wherein, otherwise, the groove base 8 runs substantially parallel to the piston axis 12. However, all embodiments have in common the fact that the protrusion depth of the oil scraper ring 4 into the ring groove 3 is limited and, even in the case of a maximum protrusion depth, the oil collecting chamber 13 for collecting the oil always remains in the spine of the oil scraper ring. The oil scraper ring 4 may in this case have two oil-scraping lips 18 and a spring element 19 which preloads the oil scraper ring 4 in a radially outward direction and presses it against the cylinder wall in order to prevents a reliable scraping-off of the oil and in particular a passage thereof into a combustion chamber.

The oil ring groove 3 according to the invention is in this case produced as follows: firstly, a piston blank of the piston 1 is produced, and the oil outflow channel 14 is formed in, for example by drilling. Subsequently, the asymmetrical oil ring groove 3, which is formed so as to be deeper in a radial direction in the region of the lower groove flank 7, is formed in, for example cut in or ground in by means of a chip-removing tool, such that a communicating connecting point 15 between the oil ring groove 3 or the oil collecting chamber 13 and the oil outflow channel 14 lies exclusively in the lower groove flank 7. In this way, it is possible in particular to avoid a three-dimensional edge structure, which can be deburred only with difficulty. The upper and the lower groove flank 6, 7 are in this case also finish-machined or fine-machined, for example ground, preferably only in a regions which comes into contact with the oil scraper ring 4, whereas the upper groove flank, the lower groove flank 7 and the groove base 8 in the region of the oil collecting chamber 16, in which there is no contact with the oil scraper ring 4, remain in a pre-machined state, for example after a process of turning the grooves, whereby the production process is made considerably simpler and less expensive.

With the piston 1 according to the invention, it is possible, owing to the asymmetrical ring groove 3, for an inadvertent lifting of the oil scraper ring 4 out of the ring groove 3, in particular during installation and transport, to be avoided, and at the same time for an oil collecting chamber 13 to be created which always remains irrespective of the protrusion depth of the oil scraper ring 4 into the oil ring groove 3, which oil collecting chamber communicates via the base-side connecting point 15, which lies exclusively in the region of the lower groove flank 7, with the oil outflow channel 14. By means of the connecting point 15 which lies exclusively in the lower groove flank 7, it is possible in particular to create a planar connecting point 15 without three-dimensional edge structure, whereby in particular the production and also the finish machining are considerably simplified.

The invention claimed is:

1. A piston for an internal combustion engine, comprising:
   at least one oil ring groove configured to receive an oil scraper ring, the at least one oil ring groove having an upper groove flank facing toward a piston crown, a lower groove flank averted from the piston crown, and a groove base;
   the at least one oil ring groove structured to be asymmetrical and deeper in a radial direction in a region of the lower groove flank;
   an oil outflow channel structured and arranged to fluidically communicate with an oil collecting chamber disposed in a spine of the oil scraper ring;
   wherein a connecting point between at least one of (i) the at least one oil ring groove and the oil outflow channel, and (ii) the oil collecting chamber and the oil outflow channel is disposed exclusively in the lower groove flank and spaced apart from a corner of the at least one oil ring groove that connects the lower groove flank and the groove base;
   the upper groove flank and the lower groove flank each include a finish-machined surface disposed only in a region which comes into contact with the oil scraper ring when the oil scraper ring is received in the at least one oil ring groove; and
   the upper groove flank, the lower groove flank, and the groove base each have a pre-machined surface in a region of the oil collecting chamber.

2. The piston according to claim 1, wherein the oil outflow channel extends parallel to a piston axis.

3. The piston according to claim 1, wherein the oil outflow channel extends obliquely with respect to a piston axis and is obliquely connected to the lower groove flank.

4. The piston according to claim 1, wherein the oil outflow channel extends orthogonally with respect to a piston axis.

5. The piston according to claim 1, wherein the upper groove flank includes a shoulder projecting into the at least one oil ring groove, the shoulder structured and arranged as a stop which limits a protrusion depth of the oil scraper ring into the at least one oil ring groove.

6. The piston according to claim 1, wherein the groove base extends obliquely with respect to a piston axis.

7. The piston according to claim 1, wherein the groove base includes, in a lower inner region, a radially inwardly directed depression.

8. The piston according to claim 1, wherein:
   the oil outflow channel extends parallel to a piston axis; and
   the oil outflow channel extends orthogonally with respect to the lower groove flank.

9. The piston according to claim 1, wherein:
   the oil outflow channel extends obliquely with respect to a piston axis;
   the oil outflow channel extends obliquely with respect to the lower groove flank; and
   the oil outflow channel is obliquely connected to the lower groove flank.

10. The piston according to claim 1, wherein:
    the oil outflow channel extends orthogonally with respect to a piston axis; and
    the oil outflow channel extends outward in the radial direction in the lower groove flank.

11. The piston according to claim 1, wherein the groove base extends between the lower groove flank and the upper groove flank in a direction that is oblique relative to a piston axis, the lower groove flank, and the upper groove flank.

12. The piston according to claim 1, wherein:
    a second corner of the at least one oil ring groove connects upper groove flank and the groove base; and
    the groove base extends linearly from the corner to the second corner in a direction that is oblique relative to a piston axis, the lower groove flank, and the upper groove flank.

13. The piston according to claim 1, wherein the connecting point is substantially planar and does not form a three-dimensional edge structure.

14. A method for producing a piston, comprising:
    drilling an oil outflow channel into a body of the piston;
    forming an asymmetrical oil ring groove in the body of the piston, the oil ring groove configured to receive an oil scraper ring, the oil ring groove having a groove base, an upper grove flank and a lower groove flank, the upper groove flank facing toward a piston crown, the lower groove flank averted from the piston crown, the oil ring groove configured to be deeper in a radial direction in a region of the lower groove flank;
    providing, exclusively in the lower groove flank, a communicating connecting point between at least one of (i) the oil ring groove and the oil outflow channel, and (ii) the oil outflow channel and an oil collecting chamber disposed in a spine of the oil scraper ring;
    deburring the connecting point via a chip-removing tool and a grinding tool; and
    wherein the oil outflow channel is structured and arranged to fluidically communicate with the oil collecting chamber of the oil scraper ring.

15. The method according to claim 14, further comprising finish-machining the upper groove flank and the lower groove flank such that (i) the upper groove flank and the lower groove flank have a finish-machined surface only in a region which comes into contact with the oil scraper ring when the oil scraper ring is received in the oil ring groove, and (ii) the upper groove flank, the lower groove flank, and the groove base have a surface in a region of the oil collecting chamber that remains pre-machined.

16. The method according to claim 14, wherein providing the connecting point includes forming the connecting point in the lower groove flank spaced apart from a corner of the at least one oil ring groove that connects the lower groove flank and the groove base.

17. A piston for an internal combustion engine, comprising:
    a piston crown;
    an upper groove flank;
    a lower groove flank disposed further from the piston crown than the upper groove flank;
    a groove base extending between and connecting the upper groove flank and the lower groove flank;
    a circumferentially extending oil ring groove defined by the upper groove flank, the lower groove flank, and the groove base, the oil ring groove opening in a radially outward direction;

the oil ring groove having a greater radial depth in a region of the lower groove flank than in a region of the upper groove flank such that the oil ring groove is asymmetrical;

an oil outflow channel structured and arranged to fluidically communicate with an oil collecting chamber disposed in a spine of an oil scraper ring arrangeable within the oil ring groove;

wherein a connecting point between the oil ring groove and the oil outflow channel is disposed exclusively in the lower groove flank;

wherein the upper groove flank and the lower groove flank each include a finish-machined surface disposed only in a region which comes into contact with the oil scraper ring when the oil scraper ring is received in the oil ring groove; and wherein the upper groove flank, the lower groove flank, and the groove base each have a pre-machined surface in a region of the oil collecting chamber when the oil scraper ring is received in the oil ring groove.

18. The piston according to claim 17, wherein the lower groove flank extends further in a radially inward direction than the upper groove flank such that the groove base extends transversely relative to a piston axis.

19. The piston according to claim 17, further comprising a piston body, wherein:

the oil ring groove is disposed in an outer circumferential surface of the piston body; and the oil outflow channel extends from the lower groove flank to the outer circumferential surface of the piston body.

* * * * *